Dec. 12, 1967   C. R. ANDERSON   3,357,802
SINGLE CYCLE IRRADIATED FUEL REPROCESSING
Filed Dec. 15, 1965   2 Sheets-Sheet 1

CLEVE R. ANDERSON, INVENTOR.

CLEVE R. ANDERSON, INVENTOR.

United States Patent Office 3,357,802
Patented Dec. 12, 1967

3,357,802
SINGLE CYCLE IRRADIATED FUEL
REPROCESSING
Cleve R. Anderson, Portola Valley, Calif., assignor
to General Electric Company, a corporation of
New York
Filed Dec. 15, 1965, Ser. No. 519,811
10 Claims. (Cl. 23—339)

ABSTRACT OF THE DISCLOSURE

This discloses a process for recovery of fissionable and fertile materials from irradiated nuclear reactor fuel in which an aqueous solution of such fuel is subjected to a single cycle organic solvent extraction to produce an aqueous stream containing uranium and a minor proportion of certain fission products but which is substantially free of fissionable and fertile materials other than uranium. This stream is then dehydrated, calcined, and directly fluorinated with elemental fluorine to produce uranium hexafluoride which is separated from residual fission product fluorides on the basis of its relatively high volatility.

---

This is a continuation-in-part of my copending application Ser. No. 212,768, filed July 26, 1962 now abandoned.

This invention relates to the reprocessing of irradiated material removed from a nuclear chain fission reactor, and relates more particularly to an improved method for the mechanical and chemical reprocessing of highly radioactive power reactor fuel, which method is characterized by its achievement of high decontamination efficiency with a substantially reduced number of processing steps and a substantial reduction in the quantity of radioactive waste materials relative to conventional methods.

Nuclear chain fission reactions and the reactors in which such reactions are accomplished are now well known. In general, a nuclear reactor is made up of a chain reacting assembly including nuclear fuel material contained in fuel elements having various geometric shapes such as plates, tubes, or rods. These fuel elements are usually provided with a corrosion resistant non-reactive heat conductive layer or clad on their external surfaces. In power reactors, these elements are usually grouped together at fixed distances from one another in a coolant flow channel or region forming what is termed a fuel assembly. A sufficiently large number of such assemblies are combined together in the chain reacting assembly or core to permit a self-sustained nuclear fission chain reaction. The reactor core is enclosed within a container through which the reactor coolant is circulated. In thermal neutron reactors, a neutron moderator is also provided, and in some cases this moderator may also perform as the reactor coolant. The known boiling water and pressurized water reactors are examples of such thermal reactors.

The nuclear fuel material contains fissionable atoms such as U-233, U-235, Pu-239, or Pu-241. This material may be in elemental or compound form. Upon absorption of a neutron by the nucleus of such a fissionable atom, a nuclear disintegration frequently results. This produces on the average two fission product atoms of lower atomic weight and of great kinetic energy. Also released in such a disintegration are several neutrons of high energy. For example, in the fission of U-235 atoms, light fission product atoms of mass number ranging between 80 and 110 and heavy fission product atoms of mass number ranging between 125 and 155 are produced. On the average, 2.5 neutrons per fission event are released. The total energy released approaches 200 mev. (million electron volts) per fission.

The kinetic energy of the fission product atoms as well as that of the fission neutrons is quickly dissipated producing heat in the fuel elements of the reactor. Some additional heat is generated directly in the reactor structural materials, in the coolant, and in the moderator due to radiation effects. If there is one net neutron remaining on the average from each fission event and this neutron induces a subsequent fission event, the fission reaction becomes self-sustaining and is thus called a chain reaction. Heat generation may be maintained and the heat is removed by passing a coolant fluid through heat exchanges relationship with the fuel elements. The fissionable atoms are thus gradually consumed. Some of the fission product atoms produced are strong neutron absorbers (fission product poisons). Thus the fission reaction tends to decrease and cannot be maintained indefinitely at a given level.

In some nuclear reactor fuel elements, fertile atoms such as U-238 and Th-232 may be included in addition to the above noted fissionable atoms. A fairly common currently used nuclear power reactor fuel material consists for example of uranium dioxide ($UO_2$) in which approximately 2.0% of the uranium atoms are U-235 which are fissionable by thermal neutrons, while the remaining 98% is U-238 which is not so fissionable to any significant degree. In the course of operating a reactor fueled with such fissionable and fertile atoms, the fissionable atoms (U-235) originally present are gradually consumed and simultaneously neutron irradiation of the fertile atoms (U-238) converts a part of them into fissionable atoms (Pu-239). Correspondingly, a fertile Th-232 atom is ultimately converted into a fissionable U-233 atom. The concentration of these newly created fissionable atoms gradually rises with irradiation and approaches an equilibrium value. These atoms are fissionable by thermal neutrons and thus contribute to the maintenance of the chain fission reaction so that the reaction may be continued longer than would have been the case if only the original charge of fissionable atoms were available.

Since the rate at which fissionable atoms are created by fertile atom conversion is always (except in the breeder-converter type of reactor of special design) less than the rate at which the original fissionable atom charge is consumed during operation, the reactor can maintain this heat generation at a given power level for only a finite length of time. Ultimately the maximum power level at which the reactor can be operated must be decreased and finally the reactor must be shut down for refueling. Some or all of the irradiated fuel assemblies are removed and replaced with new fuel assemblies having a higher concentration of fissionable atoms and no fission product poisons. The reactivity of the refueled reactor core is higher and the original power level can thus be restored.

The irradiated reactor fuel removed from the reactor ordinarily contains a valuable quantity of the original fissionable material (the fissionable atoms). It will contain also a significant quantity of fissionable material converted from any fertile material (the fertile atoms) which may have been a component of the original fuel. Irradiated fuel also may contain fission products (the fission product atoms) or transuranic isotopes (or both) which are of substantial value. Accordingly, it is highly desirable to reprocess the irradiated fuel to recover and separate these materials for reuse. Such reuse of uranium and plutonium as a practical matter requires a high degree of fission product removal to reduce radioactivity and permit direct handling. Fission product separation or "decontamination" sufficient to reduce the uranium and plutonium product radioactivity to on the order of $10^{-7}$ to $10^{-8}$ of the radioactivity of the irradiated fuel is required. Such reductions are said to involve "decontamination factors" of $10^7$ or $10^8$, respectively.

One currently utilized irradiated fuel reprocessing system has been termed the Purex Process. This process is currently in use in the chemical reprocessing of plutonium production reactor fuel. In this process, an acid solution of the irradiated fuel is extracted with an organic solvent consisting of a mixture of kerosene and tributyl phosphate. Plutonium and uranium are complexed or otherwise absorbed by the organic solvent and separated from the aqueous acid phase which contains the majority of the fission products. The plutonium-uranium organic extract phase is treated to reduce the valence state of the plutonium from 4 to 3.

The organic extract is contacted with dilute nitric acid which causes the plutonium to "salt out" back into the aqueous phase. This phase is then subjected to a second complete organic solvent extraction cycle to remove traces of fission products and uranium from the plutonium. The organic phase containing the major portion of the uranium is extracted countercurrently with water to produce a stripped organic solvent (which is recycled) and an aqueous extract containing the uranium. This aqueous phase is also subjected to another complete solvent extraction cycle to remove traces of plutonium and fission products from the uranium. The plutonium-containing product stream is finally purified by accumulation on and elution from an anion exchange resin bed. The uranium-containing product stream is finally purified by a solid adsorption treatment, such as with silica gel, to remove residual traces of ruthenium, zirconium, and niobium fission products.

There are a number of significant disadvantages in the Purex Process for irradiated fuel reprocessing. There is a substantial amount of duplicate equipment in view of the fact that three complete solvent extraction cycles,[1] each including three extraction stages, are required to produce sufficiently decontaminated plutonium and uranium products. There is produced a large volume of radioactive waste materials, approximating 1500 gallons per ton of uranium in the fuel reprocessed. This is due to the fact that the organic solvent is treated with various chemical reagents to remove degradation products before it is recycled. This organic solvent degradation becomes quite rapid in the radiation field created by the fission products and it adversely affects processing capabilities. The degradation problem is aggravated in the reprocessing of the much more highly radioactive power reactor fuels which have been irradiated to exposure levels to about 15,000 megawatt days per ton (mwd./t.) or more. Tremendous quantities of heat are consumed in liquid evaporation which is required in the concentration of streams between the several solvent extration cycles. This, of course, requires large amounts of capital equipment in the form of heat exchangers. The difficulties of remote operation and maintenance and of corrosion in this equipment are well known.

Another solvent extraction method for irradiated fuel reprocessing is termed the Redox Process. It utilizes a non-volatile salting agent and a volatile solvent, in contrast to the non-volatile solvent (tributyl phosphate in kerosene) and the volatile salting agent (nitric acid) utilized in the Purex Process. In the Redox Process a nitric acid solution of irradiated fuel is extracted with methylisobutyl ketone (hexone) as the organic solvent. The hexone extracts the plutonium and uranium leaving an aqueous solution of the fission products. An aqueous solution of aluminum nitrate is used as the salting agent.

Plutonium is separated from the organic phase into an aqueous phase in the manner similar to the Purex Process. The uranium is extracted or "salted" from the organic phase by means of dilute nitric acid. Both the uranium-containing and plutonium-containing streams so produced are subjected to second cycles of solvent extraction.

Although the solvent recovery in the Redox Process is simplified by its volatile nature, substantial volumes of waste are created in the form of solutions of the salting agent which is not recovered for reuse. The equipment is complex since the desired plutonium and uranium product decontamination factors are only achieved through three solvent extraction cycles and final product cleanup through ion exchange and solid adsorption. An undesirable degree of solvent degradation also occurs in the Redox Process, but the problem is reduced to some extent since the solvent may be fairly readily purified by evaporation processes.

Several other processes for irradiated fuel reprocessing have been proposed. One of these is termed Melt Refining. This process is limited to the treatment of metallic fuels. It includes the steps of melting the fuel in an oxide crucible such as zirconia, and holding at a temperature of 1300° C. to 1400° C. for 3 to 5 hours. Volatile fission products (xenon, krypton, and cesium) are boiled off. The very reactive fission products such as the rare earths, barium and strontium, are removed in a reaction layer that forms along the crucible walls. The noble fission products such as ruthenium, rhodium, palladium, and molybdenum are not removed and their concentrations build up to equilibrium values which depend upon the percentage of fresh material added on refabrication of the fuel to replace that consumed in the reactor and lost in reprocessing. Although this process is simple, high decontamination factors are not realized. The uranium recovered must be refabricated in shielded facilities using remotely operated equipment. Further, the recovery efficiencies are very much lower than those experienced with the Redox and Purex processes.

Another process is termed the Fused-salt Process which utilizes molten salts as reaction media. In this process, which is suitable to the treatment of uranium oxide fuels, chlorine or hydrogen chloride is used to chlorinate uranium oxide in an equimolar melt of sodium chloride and potassium chloride. The temperatures used are 750° to 800° C. The uranium oxide is deposited at a cathode in an electrolytic treatment of the molten material. This process suffers from the disadvantages of low decontamination factors, low recovery efficiency, large volumes of salt wastes, and the need for separate plutonium recovery steps.

Another process which has been proposed for the treatment of irradiated fuel involves direct fluorination. This process is based on the conversion of the uranium and plutonium available in irradiated fuel to the corresponding fluorides by direct reaction with fluorine gas followed by fractionation of the volatile uranium and plutonium fluorides. This process is currently in the developmental stage and is yet to be demonstrated in a practical application. Some of its yet unsolved difficulties include: decomposition of the plutonium fluoride, and reaction efficiencies of fluorine with the uranium and plutonium in the presence of other elements in the fuel such as molybdenum or iron.

The present invention is directed to a combination process for the chemical processing of irradiated nuclear reactor fuels in which all of the above-mentioned problems and disadvantages are overcome. The present invention is particularly directed to a fuel reprocessing operation which is simplified through reduction in the number of required reprocessing steps, in which the two principal steps of the process cooperate actively with one another

---

[1] A cycle in this sense is the transport of the uranium and plutonium from the aqueous irradiated fuel solution into the organic solvent and back into the aqueous product phases.

to achieve a remarkably efficient decontamination, and in which a substantial reduction in the quantity of radioactive waste materials which must be stored has been realized.

It is therefore a primary object of the present invention to provide a simplified chemical reprocessing procedure for the recovery of plutonium and uranium from irradiated nuclear reactor fuel at high decontamination factors in a minimum number of processing steps.

Another object of this invention is to eliminate substantially completely the production of large volumes of high activity liquid waste materials which otherwise must be retained in expensive underground storage facilities.

Other objects and advantages of this invention will become apparent to those skilled in this art as the description and illustration of the invention proceeds.

Briefly, one aspect of the present invention comprises subjecting an aqueous solution of irradiated nuclear reactor fuel to a single cycle organic solvent extraction in the presence of an aqueous salting agent to separate the uranium (together with some selected fission products) from the balance of the fission products, in combination with the direct fluorination of the uranium and selected fission products followed by separation of the volatile fluorides. It has now been found that the selected fission products which are most difficulty separated from the uranium and plutonium through the various solvent extraction processes (thereby requiring multi-cycle solvent extraction processing) can be allowed to remain in the uranium fraction since they are readily fluorinated and form relatively high boiling fluorides which are quite simply separated at high decontamination factors from the relatively low boiling uranium hexafluoride.

In somewhat greater detail, one aspect of the present invention comprises the dissolution of irradiated nuclear reactor fuel, such as in a strong mineral acid like nitric acid; the single cycle organic solvent extraction of the irradiated fuel solution in the presence of an aqueous salting agent to produce a substantially plutonium free aqueous stream containing the uranium and certain selected fission products; dehydration and calcining of this aqueous stream; fluorination of the anhydrous product of the dehydration-calcination step; and the separation of the relatively low boiling uranium hexafluoride from the relatively high boiling selected fission product fluorides. Also produced is an aqueous extract of fission products which is calcined to produce a minimum volume fission product stream and to recover nitric acid which is recirculated. An aqueous stream of plutonium nitrate which is also produced is treated to recover the plutonium by the customary ion exchange procedures.

The above-noted selected fission products include ruthenium, zirconium, and niobium. A substantial but incomplete proportion of these materials is customarily separated with the other fission products from the uranium and plutonium. The extent to which these materials appear in the organic extract with the uranium (and plutonium or thorium if present) varies considerably depending on extraction conditions. For example in the organic solvent extraction of irradiated low enrichment uranium fuels, the acidity of the spent fuel solution strongly influences the distribution of the selected fission products between the organic and aqueous phases. With the feed 3 molar in hydrogen ion, ruthenium tends to concentrate in the aqueous phase with the other fission products while zirconium and niobium tend to concentrate in the organic phase with the uranium and plutonium. With the feed 2 molar in hydrogen ion, a reversed distribution occurs. All three of these fission products are of course highly radioactive and intolerable in the product streams containing the uranium and plutonium, and it is for this reason that the conventional solvent extraction processes require repetitive or multi-cycle extractions and special product cleanup treatments.

In the operation of such prior art multi-cycle solvent extraction processes, an upset in processing conditions may produce product streams continuing the uranium and plutonium with markedly increased quantities of radioactivity due to these selected fission products passing from one cycle to the next. This can increase the radioactivity of the next cycle by factors of from 10 to 1000 depending on the magnitude of the process upset. Several days may be required to work out of this situation. The degree of separation required of about ten million to one between the uranium and plutonium on the one hand and the fission products on the other leave little flexibility in multi-cycle solvent extraction processes for radioactivity carryover from one cycle to the next.

With the present invention however, the single solvent extraction cycle performs only a gross separation from the fission products. The combined process performs efficiently even though all the ruthenium, niobium, and zirconium appear in the uranium stream since in the fluorination-fractionation step of the process a high degree of separation of these selected fission products from the uranium is readily accomplished due to the considerably greater than 100° C. difference in the boiling points of the respective fluorides. Decontamination factors on the order of $10^9$ are realized in the process of this invention with relatively uncomplicated equipment. This is to be compared with factors of $10^7$ realized in the Purex Process which requires complex multi-cycle extraction and clean-up equipment and which is subject to long term operational upsets if selected fission products accidently appear in the organic phase with the uranium and plutonium. The process of this invention therefore is capable of treating very highly radioactive fuel discharged from power reactors and separating by means of considerably simplified equipment thoroughly decontaminated uranium and plutonium products which easily meet current industry specifications for maximum radioactivity levels.

The present invention will be more readily understood by reference to the following detailed description which includes references to the accompanying drawings in which.

Figure 1:
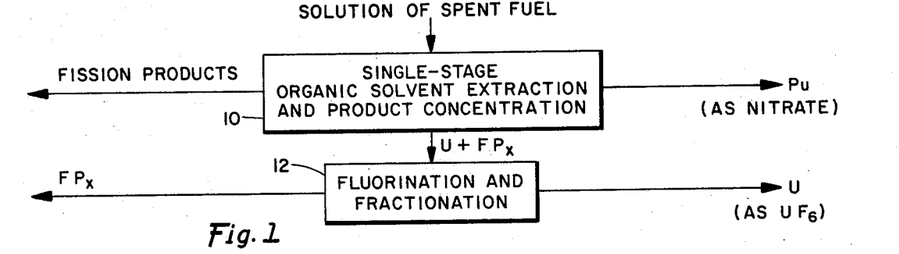
FIGURE 1 is a simplified block diagram illustrating the basic principles of the process of the present invention.

Referring now more particularly to FIGURE 1, a simplified block diagram of the process of this invention is shown. The process is seen to consist of two major parts. The first part consists of a plurality of steps carried out in the presence of an aqueous phase (block 10) and the second part consists of steps carried out under anhydrous conditions (block 12). A solution of the irradiated reactor fuel is subjected to a single cycle organic solvent extraction procedure represented by block 10. From this portion of the process, the bulk of the fission products, including some but not all of certain selected fission products (designated $FP_x$) are produced as a solid waste product stream; the plutonium is produced as an aqueous nitrate solution, and the uranium and the remainder of the selected fission products are produced together as an aqueous nitrate stream. This latter stream is evaporated and calcined to produce an anhydrous solids stream. This material is introduced into the second or anhydrous part of the process in which the anhydrous uranium and selected fission product stream is subjected to direct fluorination and fractionation of the volatile uranium and selected fission product fluorides. At atmospheric pressure, uranium hexafluoride boils at 56° C. and is readily separable from the selected fission product fluorides which boil more than 100° C. higher. Niobium fluoride boils at about 225° C., ruthenium fluoride boils at about 300° C., and zirconium fluoride boils above 300° C.

Figure 2:
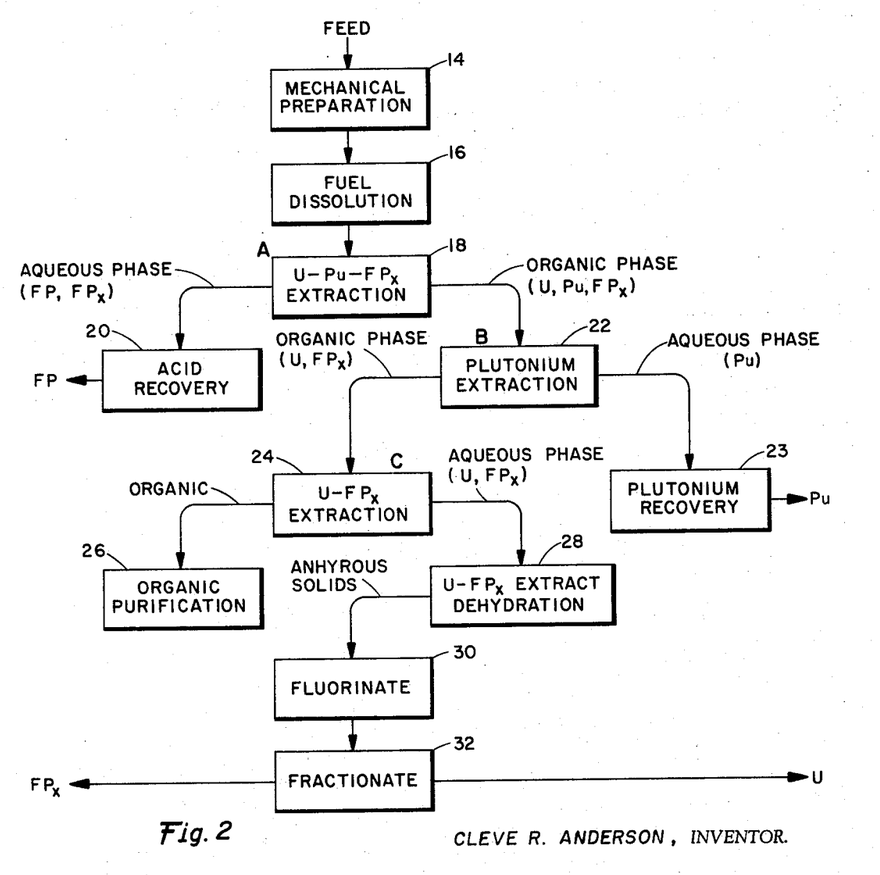
FIGURE 2 is a somewhat more elaborate block diagram illustrating the key steps of the process in this invention.

Referring now more particularly to FIGURE 2, a more elaborate block diagram illustrating the process of this invention is given. Steps 14, 16, 18, 20, 22, 23, 24, 26, and 28 illustrated in FIGURE 2 constitute steps carried out in the presence of an aqueous phase and thus are included in block 10 of FIGURE 1. Steps 30 and 32 of FIGURE 2 illustrate those steps carried out under anhydrous conditions and are the steps included in block 12 of FIGURE 1.

In FIGURE 2 irradiated nuclear reactor fuel is introduced to mechanical preparation step 14. Here the flow channels, lifting bales, nose pieces, and other non-fuel-containing removable parts of the fuel assembly are removed. If desired, mechanical disassembly of the fuel rod assembly such as by separating individual fuel rods may also be performed. In one preferred embodiment, the individual fuel rods are further chopped into short sections about one inch long. In another preferred embodiment of the invention, the entire full length fuel rods are passed through a rolling and punching mechanism which perforates the clad and crushes to a slight extent the fuel material contained within the fuel element. Either of these latter two operations are designed to increase the access of the dissolving acid to the fuel material.

The thus prepared fuel is introduced into fuel dissolution step 16. In this step the irradiated fuel is contacted with a strong mineral acid to dissolve the fuel material, preferably leaving the clad metal (such as zirconium or stainless steel) substantially unaffected. This treatment produces an aqueous acid solution of the uranium, plutonium, and fission products which may be separated from undissolved clad material by decantation, filtration, or similar operations.

The irradiated fuel solution is introduced into uranium-plutonium extraction step 18. This extraction step is carried out in the A column illustrated in FIGURE 3. In this step the irradiated fuel solution is countercurrently contacted with one of the organic solvents referred to herein. The uranium and plutonium concentrate in the organic extract phase while the fission products (except for some of the selected fission products) are retained in the acidic aqueous raffinate phase. As noted above, the control of the extraction conditions determines to a substantial degree the extent to which the various selected fission products are extracted by the organic solvent along with the uranium and plutonium. The aqueous raffinate phase from the A column contains the remainder of the selected fission products and the other fission products contained in the irradiated fuel treated.

The aqueous raffinate phase from step 18 is introduced into acid recovery step 20. Here the fission products are separated from the aqueous raffinate for disposal. In processes where the fuel has been dissolved in a volatile acid such as nitric acid, the aqueous raffinate may be heated to evaporate water and to recover a substantial part of the acid for reuse. The fission product solids remaining are calcined to produce a substantially anhydrous fission product waste stream of minimum volume for permanent storage.

The organic extract phase, containing the uranium and plutonium and some of the selected fission product produced in extraction step 18, is introduced into plutonium extraction step 22. This step is effected in the B column illustrated in FIGURE 3.

In plutonium extraction step 22 the organic extract phase is countercurrently contacted with a dilute solution of nitric acid containing ferrous ions. In this step, the ferrous ion functions to reduce the plutonium valence from 4 to 3. The dilute nitric acid extracts or salts out the thus reduced plutonium from the organic phase leaving a substantially plutonium-free organic raffinate phase containing the uranium and part of the selected fission products and producing an aqueous extract containing substantially all of the plutonium.

The aqueous extract phase is introduced into plutonium recovery step 23 in which conventional plutonium recovery techniques applicable to aqueous plutonium-bearing solutions are applied. For example, the solution may be treated with strong nitric acid and an agent such as sodium nitrite ($NaNO_2$) to convert the plutonium to a 4 valence state. The plutonium is recovered by ion exchange and elution techniques producing an aqueous plutonium nitrate product solution.

The organic raffinate phase produced in plutonium extraction step 22 is introduced into uranium-selected fission product extraction step 24. This step is accomplished in the C column illustrated in FIGURE 3. In this step the organic phase is countercurrently contacted with very dilute nitric acid which serves to extract or salt out the uranium and the selected fission products leaving a lean organic solvent as raffinate and producing a substantially plutonium-free aqueous uranium-selected fission product extract. The lean organic solvent is introduced into organic purification step 26.

For the dialkyl di-ethers used in one embodiment of the present invention (see Example I), this purification step may conveniently comprise a distillation column in which the organic solvent is dehydrated and recycled for reuse. This produces a small amount of aqueous waste which may be evaporated and calcined following treatment to recover any residual traces of plutonium and uranium. For the tributyl phosphate-hydrocarbon solvents used in other embodiments of this invention (see Examples II and III), the purification conveniently comprises an aqueous wash with a 5% solution of sodium carbonate followed by decantation of the treated organic solvent.

The aqueous extract from uranium-selected fission product extraction step 24 is introduced into evaporation-dehydration step 28. Here the aqueous uranium and selected fission product extract solution is evaporated to remove water and dilute acid. The concentrated solution is heated to remove residual traces of acid and to produce an anhydrous solid material comprising a mixture of uranium trioxide ($UO_3$) and selected fission product oxides. The recovered acids are recirculated for reuse in the process. The anhydrous solids are discharged from step 28. This completes the operations in the aqueous part of the process of this invention illustrated by block 10 in FIGURE 1.

The calcined anhydrous solid material is introduced into fluorination step 30. Here the mixed oxides are directly fluorinated to convert them to the corresponding fluorides. The fluorination is conducted in a single stage process using elemental fluorine as the fluorinating agent. The fluorination step produces a volatile mixture of uranium hexafluoride and selected fission product fluorides in the vapor phase.

The fluoride vapors thus produced are introduced into fluoride fractionation step 32. In the simplest embodiment of this invention, this step constitutes simply a partial condensation of the fluoride vapors. The relatively high boiling (about 225°–300° C.) selected fission product fluoride causes it to condense readily from the relatively low boiling (about 55° C.) uranium hexafluoride. This produces a stream of selected fission product fluorides and a product stream of uranium hexafluoride. In more elaborate embodiments of this invention, fractionation step 32 comprises a distillation column provided with a sufficient number of trays to produce higher degrees of separation of fission product fluorides and uranium hexafluoride. Trace quantities of other elements carried over from the solvent extraction step would also be separated from uranium in this fractionation step.

*Example I*

Figure 3:
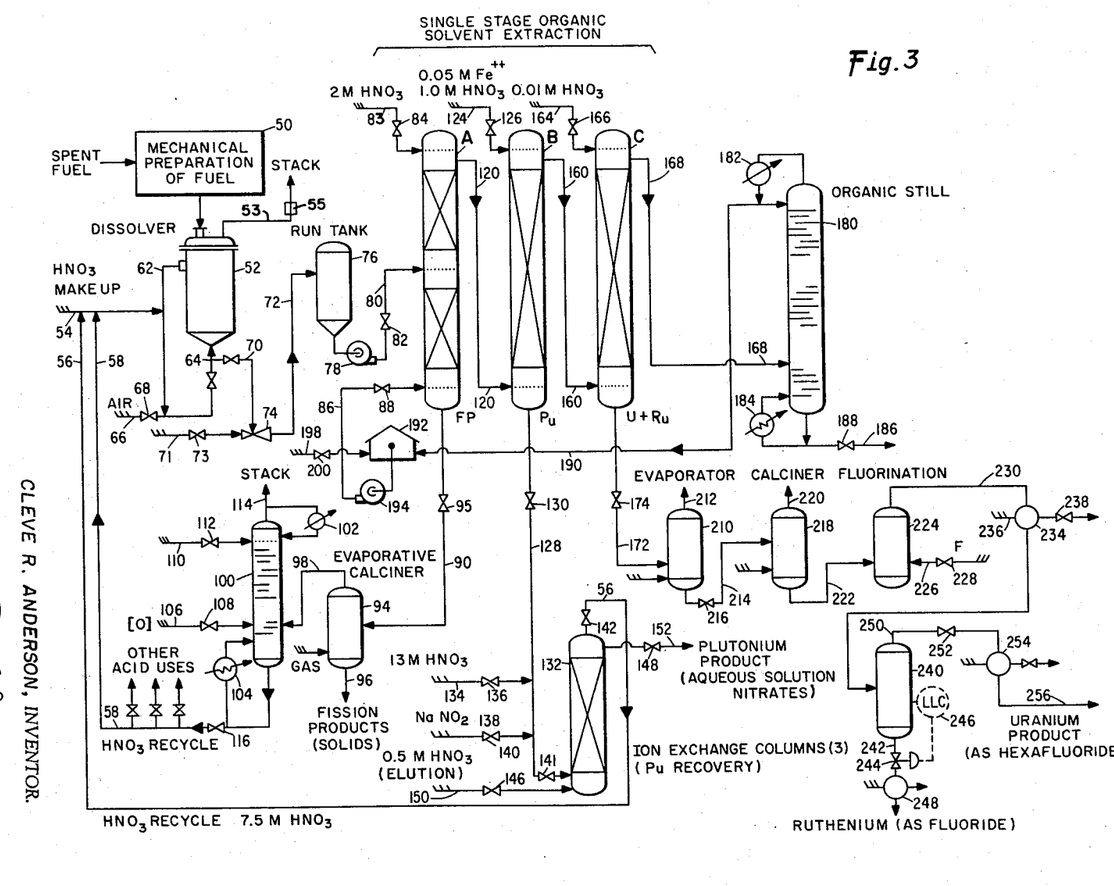
FIGURE 3 is a schematic flow diagram of one embodiment of the invention.

Referring now to FIGURE 3, a schematic flow diagram of one embodiment of the invention is shown. The description of FIGURE 3 will be conducted in the form of a specific example of the present invention applied to the reprocessing of irradiated $UO_2$ type power reactor fuel which has been irradiated to approximately 15,000 mwd./t. Irradiated fuel is received in the form of assemblies approximately 10 feet long and 3.75 inches square. The assemblies consist of a 6 x 6 square array of fuel rods approximately 0.5 inch in diameter clad with a tube of zirconium alloy and originally containing $UO_2$ of 1.5% enrichment. These fuel assemblies also include a zirconium tube flow channel, a lifting bale, and a nose piece.

The irradiated fuel assemblies are introduced into mechanical preparation zone 50. Here the channels, lifting bales, and nose pieces are removed and the fuel rod bundle is chopped into pieces approximately one inch long. A 500 pound charge of the thus treated fuel is introduced in dissolving zone 52 for dissolution. The dissolving agent is strong nitric acid. Make-up acid is introduced through line 54 along with recycle acid introduced through lines 56 and 58 to form an approximately 8 molar solution. This solution is recirculated by means of an air lift through dissolver 52 and lines 62 and 64. Air is introduced through line 66 controlled by valve 68. Air and gases released during fuel dissolution are vented to a stack 53 through gas clean-up means 55. Upon dissolution of the fuel material, the solution is discharged through lines 64, 70 and 72 by means of jet pump 74 into run tank 76 at a rate controlled by valve 73 in steam inlet line 71. The solution is approximately 2 to 3 molar in nitric acid at the end of a dissolving cycle. Undissolved clad metal held in a basket not shown is removed from dissolver 52 and following removal of the dissolver solution a subsequent charge of irradiated fuel is introduced. The dissolver cycle is repeated and the irradiated fuel solutions thus produced are accumulated in run tank 76. Several dissolver zones 52 may be operated simultaneously. The irradiated fuel solutions so produced are periodically introduced through line 72 by means of jet pump 74 into one or more run tanks 76 which serve as a reservoir for solution subsequently treated in the continuously operating single-stage solvent extraction part of the process.

This solvent extraction is carried out in three solvent extraction columns designated A, B, and C in FIGURE 3. These columns are of known construction and they may be provided with contacting trays, or plates, or solid packing to enhance the liquid-liquid contact. Preferably, the columns are of the packed type since the packed column can be operated with a minimum of moving parts. Plate columns normally require a mechanical pulser to obtain adequate contact and flow of the organic-aqueous streams.

The irradiated fuel solution is pumped from run tank 76 by means of pump 78 through line 80 at a rate controlled by valve 82 into the A column. This solution is about 1 molar in uranium nitrate hexahydrate, and about 2.2 molar in nitric acid. In the A column feed stream, the uranium, plutonium, the selected fission products, and the other fission product contents are each taken as equal to 100 in arbitrary units (AU) for purposes of the following discussion.

The irradiated fuel solution is introduced through line 80 at an intermediate point of the A column. Dilute nitric acid of two molar concentration is introduced at the top of the A column through line 83 at a rate controlled by valve 84. The volumetric flow rate is approximately 30% of that of the feed. A dialkyl di-ether, such as diethoxybutane or dimethoxypentane or mixtures thereof, is introduced into the bottom of the A column through line 86 at a rate controlled by valve 88. The volumetric flow rate of the organic solvent is approximately 400% of the A column feed. In the portion of the A column below the feed point, the organic solvent countercurrently contacts the aqueous 2.2 molar nitric acid feed solution and extracts or absorbs the uranium, plutonium, and some of the selected fission products into the organic phase. The organic phase rises in the column past the feed point into the upper portion of the column. Here the organic extract is countercurrently contacted with the two molar nitric acid salting solution which serves to strip from the organic phase traces of fission products other than the selected fission products. These materials flow downwardly through the column in the aqueous phase past the feed point into the lower zone for retreatment.

From the bottom of the A column through line 90 at a rate controlled by valve 95, is produced an aqueous raffinate containing the fission products including some of the selected fission products. This stream also contains residual traces of uranium and plutonium in the amount of approximately 0.1 AU each. The aqueous raffinate is introduced through line 90 into evaporative calcining zone 94. Here the raffinate is heated to temperatures as high as 600° C. This treatment evaporates water contained in the stream, evolves nitric acid and mixed oxides of nitrogen, and produces the fission products in anhydrous solid form. The anhydrous solids are discharged from zone 94 through line 96 and are sent to further recovery operations if desired or to suitable shielded storage. The water vapor, nitric acid vapors, and mixed oxides of nitrogen are passed from zone 94 through line 98 into nitric acid absorption column 100. This column is provided with an overhead condenser 102 and a bottoms reboiler 104. Air or other oxidizing gas is introduced into the bottom of column 100 by means of line 106 at a rate controlled by valve 108. Dilute nitric acid is introduced into the top of column 100 by means of line 110 controlled by valve 112. In column 100, nitrogen dioxide ($NO_2$) and its dimer ($N_2O_4$) react with water to produce nitric acid ($HNO_3$) and nitric oxide (NO). The nitric oxide is oxidized with air to produce nitrogen dioxide. From the top of column 100 through line 114, noncondensible gases (principally nitrogen) are removed and sent to a stack not shown. From the bottom of column 100 through line 58 is removed concentrated nitric acid at a rate controlled by valve 116. This acid is recirculated in the process.

From the top of A column through line 120 at the overflow rate is removed the organic extract containing the uranium and plutonium and some of the selected fission products. This constitutes the feed introduced at the bottom of the B column. Dilute 1.0 molar nitric acid, which is also 0.05 molar in ferrous iron, is introduced at the top of the B column through line 124 and controlled by valve 126. The flow rate is equal to about 10% of the B column feed. The organic phase rises through the B column countercurrent to the descending nitric acid phase. Under these conditions the nitric acid phase extracts the plutonium from the organic phase producing an aqueous extract. This extract is removed from the bottom of the B column through line 128 at a rate controlled by valve 130. This stream contains 99.8 AU of the plutonium and 0.5 AU of the uranium.

To the B column bottoms product is added 13.0 molar nitric acid through line 134 controlled by valve 136 and a sodium nitrite solution introduced through line 138 controlled by valve 140. The mixed solution is introduced through line 128 and valve 141 to ion exchange column 132 where plutonium nitrate accumulates on an anion type ion exchange resin. The residual solution is 7.5 molar in nitric acid and flows through line 56 and valve 142. It is recirculated in the process. The ion exchange column is operated batchwise and several (such as three) columns are operated simultaneously to provide for continuous plutonium separation. After treatment of the B column extract, fresh 7 molar nitric acid is used to rinse the bed. Then valves 141 and 142 are closed, and valves 146 and 148 are opened. The resin is then eluted with a stream of 0.5 molar nitric acid introduced through line 150. This displaces plutonium nitrate from the resin and it is discharged as an aqueous solution through line 152. This product stream contains about 50 grams per liter plutonium nitrate, and contains 99.8 AU of the plutonium present in the A column feed.

The B column overhead is a substantially plutonium-free organic raffinate containing the uranium and selected fission products. This stream flows through line 160 at the overflow rate and is introduced at the bottom of the C column. At the top of the C column, very dilute (0.01 molar) nitric acid is introduced through line 164 controlled by valve 166 at a rate equal to 100% of the organic feed to the C column. The organic phase rises countercurrent to the descending nitric acid phase which extracts the uranium and selected fission product values. The C column overhead comprises a lean organic solvent which is removed through line 168 at the overflow rate. It is sent to a purification step subsequently described. The C column bottoms product is an aqueous extract containing the uranium and selected fission products. This stream is removed through line 172 at a rate controlled by valve 174.

The C column overhead, consisting of a lean organic solvent, is introduced into distillation column 180. This column also is provided with bubble cap trays or other suitable means for enhancing the vapor-liquid contact. The column is further provided with an overhead condenser 182 and a bottoms reboiler 184. A conventional fractional distillation is carried out by this means to dehydrate the organic solvent for reuse in the process. With diethoxybutane or with dimethoxypentane, the bottoms product consists of an aqueous waste fraction containing some residual dissolved materials and amounting to approximately 20 gallons per ton of uranium treated. This solution is removed as a bottoms product from column 180 by means of line 186 at a rate controlled by valve 188. Preferably, this material is evaporated, calcined, and combined with the fission product solids waste stream from evaporative calciner 94. The overhead product from column 180 consists of dehydrated organic solvent which flows through line 190 to tank 192. From this tank, it is introduced at the bottom of the A column through line 86 by means of pump 194 at a rate controlled by valve 88 as previously described. To make up normal processing losses, fresh organic solvent is introduced into tank 192 through line 198 at a rate controlled by valve 200.

The C column bottom product flows at a rate about equal to 400% of the A column feed and is an aqueous solution which is about 0.25 molar in uranium nitrate hexahydrate. This stream contains the selected fission products, 99.4 AU uranium, and 0.1 AU plutonium. This stream is decontaminated by factors of between about $10^3$ and $10^6$ relative to the A column feed for all except the selected fission product activity.

This aqueous stream is passed by means of line 172 into evaporator 210 where the solution is evaporated to form a concentrated solution of between about 60% and 100% uranium nitrate hexahydrate. The water and dilute nitric acid evolved are passed through line 212 (incompletely shown) into nitric acid absorption column 100. The concentrated solution from evaporator 210 is passed through line 214 at a rate controlled by valve 216 into calciner 218. Here the concentrated solution is evaporated and heated to a temperature of about 300° C. which effectively calcines the residual solids and converts the uranium substantially completely to uranium trioxide $(UO_3)$[2] and the selected fission products to their respective oxide forms. Residual moisture, nitric acid, and mixed oxides of nitrogen are removed through line 220 (incompletely shown) and may be introduced to nitric acid absorption column 100 for recovery and reuse in the process. Some fission product ruthenium may also volatilize in this calcining step, and it is removed from the evolved gases by contact adsorption means not shown. The calcined solids are removed from calciner 218 through line 222. These solids include 99.4 AU of uranium, the selected fission products, and 0.1 AU plutonium.

The calcined solids are directly introduced through line 222 into fluorination zone 224. These materials are contacted by elemental fluorine at a temperature between about 300° C. and 600° C. to convert the uranium trioxide to uranium hexafluoride and the selected fission products to their respective fluorides. The fluorine is introduced through line 226 at a rate controlled by valve 228.

The fluorination step product vapors, comprising primarily a mixture of uranium hexafluoride and selected fission product fluorides, are passed by means of line 230 through partial condenser 234. The outlet temperature of condenser 234 is controlled by regulating the coolant flow through line 236 by means of valve 238. By this means, the extent of partial condensation may be regulated forming a vapor-liquid mixture having the desired compositions.

Substantially all of the zirconium, niobium, and ruthenium fluorides are condensed and substantially all of the uranium hexafluoride remains in the vapor phase. This mixture is introduced into separator drum 240 from which the zirconium-niobium-ruthenium fluorides condensate is removed through line 242 at a rate controlled by valve 244 and liquid level controller 246. This liquid stream is passed through aftercooler 248 and is removed from the system as a product stream. The uncondensed uranium hexafluoride passes from separator drum 240 through line 250 at a rate controlled by valve 252 and is completely condensed in condenser 254. The uranium hexafluoride product stream passes to storage through line 256. This product stream contains 99.4 AU of the uranium fed to the system. By substitution of separator drum 240 and partial condenser 234 with a distillation column having approximately 10 theoretical trays, the uranium hexafluoride product can be further purified so that it contains substantially no fission products. The decontamination factor of the fluorination-fractionation step is between $10^4$ and $10^6$ depending on whether the mixed fluorides are partially condensed or fractionally distilled.

*Example II*

A second embodiment of this invention is described below, and is a modification of the process described in connection with FIGURE 3. In this embodiment, the organic solvent is a solution of tributyl phosphate in kerosene, a paraffinic hydrocarbon boiling between about 400° F. and about 560° F. A common concentration of tributyl phosphate in kerosene is 30% by weight. For higher enrichment fuels this may be reduced to as low as about 1% as a means for controlling the uranium concentration. The solvent is handled exactly as described in Example I except for its treatment after discharge from the C column and prior to reintroduction into the A column. Instead of a fractional distillation, the tributyl phosphate-solution is extracted with an aqueous 5% sodium carbonate solution and the mixture is allowed to settle. The clean tributyl phosphate-hydrocarbon is decanted and recirculated through line 190 for reuse in the A column.

In this embodiment, the acidity of the A column feed is adjusted to about 3 molar in nitric acid. Under these conditions of acidity, the selected fission products extracted by the organic solvent along with the uranium and plutonium values are primarily zirconium and niobium. The ruthenium in this embodiment is concentrated in the aqueous raffinate phase and is removed from the A column with the other fission products through line 90. The zirconium-niobium continue along with the uranium through the process as described in Example I and are calcined in calcining zone 218. The resulting zirconium and niobium oxides however have volatilities at calciner temperatures which are substantially lower than that of ruthenium and accordingly no significant amounts of the zirconium and niobium are evolved in the calciner discharge gas. The mixed uranium trioxide and the zirconium and niobium oxides are fluorinated in zone 224. The vola- ---
[2] Uranium Production Technology, edited by Chas. D. Harrington and Archie E. Ruehle, published 1959 by Van Nostrand, pages 46–7, 186–7.

tile fluoride mixture is fractionated by partial condensation, or fractional distillation if desired, as described in the foregoing Example I, the relatively high boiling zirconium and niobium fluorides being produced through line 242 as the product in place of the ruthenium fluoride.

*Example III*

A third embodiment of this invention involves the treatment of irradiated thorium-containing fuels, specifically thorium oxide ($ThO_2$) irradiated to about 10,000 mwd./t. The process is somewhat similar to that described in Example II in that the organic solvent is a kerosene solution of tributyl phosphate, and nitric acid of decreasing molarity is used as salting solutions in the A, B, and C columns. The fuel is dissolved in strong nitric acid in the presence of a small but effective amount of fluoride ion to produce a solution of uranium, thorium, and fission product nitrates adjusted to a 3 molar nitric acid solution.

In the A column, the acidity is controlled to cause the organic solvent to extract both the uranium and thorium together with some of the selected fission products. The acidic raffinate phase contains the balance of the fission products. The A column overhead is countercurrently extracted in the B column with about 1 molar nitric acid to produce an organic raffinate overhead containing the uranium and some selected fission products, and an aqueous extract bottoms containing the thorium. Preferably the thorium extract is reduced to minimum volume for storage, or in some cases it can be subsequently processed for recovery. The organic raffinate overhead from the B column is countercurrently extracted with very dilute (0.01 molar) nitric acid which produces a lean organic solvent which may be recirculated, and produces a substantially thorium-free aqueous extract bottoms containing the uranium and some selected fission products. These are processed by evaporation, calcination, fluorination, and fractionation as described previously.

In the foregoing Examples I and II are illustrated two embodiments of this invention in which different organic solvents and different A column feed acidities were used. It should however be understood that one stage of other extraction processes may be substituted using other organic solvents. For example one stage of Redox Process solvent extraction can be employed using methylisobutyl ketone as the solvent and aqueous aluminum nitrate as the salting agent. Similarly one stage of Butex Process solvent extraction may be employed which uses dibutyl carbitol and nitric acid as the organic solvent and the salting agent, respectively. Further, dialkyl di-ethers other than the two specifically referred to in Example I may be substituted. The di-ethers applicable in this process include those represented by the following formula:

where $R_1$ and $R_2$ are alkyl radicals having from 1 and to about 5 carbon atoms, and $n$ is an integral number between about 3 and about 7.

There is another class of organic materials which qualify for use in the solvent extraction part of the process of this invention, and these materials are the organonitrogen and organophosphorous compounds. These are reported in Report No. 3030 ORNL, dated Jan. 12, 1961. They behave as liquid ion exchange resins and are capable of extraction of uranium from a wide variety of acid media.

Although the foregoing examples have dealt with reprocessing of $UO_2$ and $ThO_2$, it should be understood that the process of this invention is not so limited. The process is applicable to reprocessing of any fuel material, whether it be in elemental form (uranium, plutonium, or thorium metal or alloys thereof) or in compound form (such as the oxides, carbides, nitrides, silicides and other refractory compounds of such metals). The only requirement is that the fuel material be dissolved in an appropriate solvent such as strong mineral acid or acids for example.

Several particular embodiments of this invention have been described in considerable detail by way of illustration. It should be understood that various other modifications and adaptations thereof may be made by those skilled in that particular art without departing from the spirit and scope of this invention as defined in the following claims.

I claim:

1. A method for treating an aqueous solution of irradiated nuclear reactor fuel which comprises subjecting said solution to a single cycle extraction with an organic solvent in the presence of an aqueous salting agent to produce an organic extract stream containing substantially all of the fissionable-fertile materials and a minor proportion of fission products including at least one fission product selected from the class consisting of ruthenium, zirconium, and niobium; treating said organic extract to remove substantially all of any fissionable-fertile materials other than uranium; further treating said organic extract to form an aqueous extract stream containing uranium and said selected fission products; dehydrating said aqueous extract stream to form anhydrous uranium trioxide ($UO_3$) and fission product oxides; directly and without intervening chemical treatment fluorinating said uranium trioxide and fission product oxides with elemental fluorine to form uranium hexafluoride and the corresponding fission product fluorides; and separating the relatively low boiling uranium hexafluoride from the relatively high boiling fission product fluorides.

2. A method according to claim 1 in combination with the step of producing said aqueous solution by dissolving irradiated nuclear reactor fuel in a strong mineral acid.

3. A method for treating an aqueous solution of irradiated nuclear reactor fuel which comprises subjecting said solution to a single cycle of solvent extraction with an organic solvent in the presence of a first aqueous salting agent to produce an aqueous raffinate stream containing substantially all fission products except part of at least one selected fission product selected from the class consisting of ruthenium, zirconium, and niobium, and to produce an organic extract stream containing substantially all of the fissionable-fertile materials and said part of said selected fission products; treating said organic extract with a second aqueous salting agent to remove substantially all of any fissionable-fertile materials other than uranium; further treating the organic extract with a third aqueous salting agent to form an aqueous extract stream containing uranium and said part of said selected fission products; dehydrating said aqueous extract stream to form anhydrous uranium trioxide and fission product oxides; directly and without intervening chemical treatment fluorinating said uranium trioxide ($UO_3$) and fission product oxides with elemental fluorine to convert them respectively to uranium hexafluoride and the corresponding fission product fluorides; and separating the relatively high boiling selected fission product fluorides from the relatively low boiling uranium hexafluoride.

4. A method according to claim 3 in combination with the step of maintaining the acidity of said aqueous solution of irradiated nuclear reactor fuel introduced to said solvent extraction cycle at about 2 molar in hydrogen ion whereby said selected fission product in said aqueous extract stream is predominantly ruthenium.

5. A method according to claim 3 in combination with the step of maintaining the acidity of said aqueous solution of irradiated nuclear reactor fuel introduced to said solvent extraction cycle at about 3 molar in hydrogen ion whereby said selected fission product in said aqueous extract stream is predominantly zirconium and niobium.

6. A method for separating fission products from the fissionable-fertile materials in an aqueous solution of irradiated nuclear reactor fuel which comprises subjecting said solution to a single-cycle three-stage solvent extraction with an organic solvent in the presence of an aqueous salting agent; said three-stage solvent extraction comprising (A) countercurrently contacting said solution with an organic solvent in the presence of a first aqueous salting agent solution to produce an organic extract containing substantially all of the fissionable-fertile materials and at least part of at least one selected fission product selected from the class consisting of ruthenium, zirconium, and niobium, and to produce an aqueous raffinate containing the fission products including the balance of said selected fission products, (B) countercurrently contacting said organic extract with a second aqueous salting agent solution to produce a first aqueous extract containing substantially all of any fissionable-fertile materials other than uranium, and to produce an organic raffinate containing substantially all of said uranium and said part of said selected fission products, (C) countercurrently contacting said organic raffinate with a third aqueous salting agent solution to produce a lean organic solvent as raffinate and to produce a second aqueous extract containing said uranium and said part of said selected fission products; dehydrating said second aqueous extract stream by evaporation and calcining it to produce anhydrous uranium trioxide ($UO_3$) and fission product oxides; directly and without intervening chemical treatment fluorinating said anhydrous uranium trioxide and fission product oxides with elemental fluorine to produce uranium hexafluoride and the corresponding fission product fluorides; and fractionating the fluoride mixture so produced to separate the relatively high boiling selected fission product fluorides substantially completely from the relatively low boiling uranium hexafluoride to produce an acceptably decontaminated uranium hexafluoride product.

7. A method for separating fission products from the uranium and plutonium in an aqueous solution of irradiated nuclear reactor fuel which comprises subjecting said solution to a single-cycle three-stage solvent extraction with an organic solvent in the presence of an aqueous salting agent; said three-stage solvent extraction comprising (A) countercurrently contacting said solution with an organic solvent in the presence of a first aqueous salting agent solution to produce an organic extract containing substantially all of the uranium and plutonium and at least part of at least one selected fission product selected from the class consisting of ruthenium, zirconium, and niobium, and to produce an aqueous raffinate containing the fission products including the balance of said selected fission products, (B) countercurrently contacting said organic extract with a second, aqueous salting agent solution to produce a first aqueous extract containing substantially all of the plutonium, and to produce a substantially plutonium-free organic raffinate containing substantially all of the uranium and said part of said selected fission products. (C) countercurrently contacting said organic raffinate with a third aqueous salting agent solution to produce a lean organic solvent as raffinate and to produce a second aqueous extract containing said uranium and said part of said selected fission products; dehydrating said second aqueous extract stream by evaporation and calcining it to produce an anhydrous mixture of uranium trioxide ($UO_3$) and fission product oxides; directly and without intervening chemical treatment fluorinating said anhydrous mixture of oxides with elemental fluorine to produce a mixture of uranium hexafluoride and the corresponding fission product fluorides; and fractionating the fluoride mixture to separate the relatively high boiling selected fission product fluorides substantially completely from the relatively low boiling uranium hexafluoride to produce an acceptably decontaminated uranium hexafluoride product.

8. A method for separating fission products from the thorium and uranium in an aqueous solution of irradiated nuclear reactor fuel which comprises subjecting said solution to a single-cycle three-stage solvent extraction with an organic solvent in the presence of an aqueous salting agent; said three-stage solvent extraction comprising (A) countercurrently contacting said solution with an organic solvent in the presence of a first aqueous salting agent solution to produce an organic extract containing substantially all of the thorium and uranium and at least part of at least one selected fission product selected from the class consisting of ruthenium, zirconium, and niobium, and to produce an aqueous raffinate containing the fission products including the balance of said selected fission products, (B) countercurrently contacting said organic extract with a second aqueous salting agent solution to produce a first aqueous extract containing substantially all of the thorium, and to produce a substantially thorium-free organic raffinate containing substantially all of the uranium and said part of said selected fission products, (C) countercurrently contacting said organic raffinate with a third aqueous salting agent solution to produce a lean organic solvent as raffinate and to produce a second aqueous extract containing said uranium and said part of selected fission products; dehydrating said second aqueous extract stream by evaporation and calcining it to produce an anhydrous mixture of uranium trioxide ($UO_3$) and fission product oxides; directly and without intervening chemical treatment fluorinating said anhydrous mixture of oxides with elemental fluorine to produce a mixture of uranium hexafluoride and the corresponding fission product fluorides; and fractionating the fluoride mixture to separate the relatively high boiling selected fission product fluorides substantially completely from the relatively low boiling uranium hexafluoride to produce an acceptably decontaminated uranium hexafluoride product.

9. A method for separating fission products from the uranium and plutonium in an aqueous solution of irradiated nuclear reactor fuel which comprises subjecting said solution a single-cycle three-stage solvent extraction with an organic solvent in the presence of an aqueous salting agent; said three-stage solvent extraction comprising (A) countercurrently contacting said solution with an organic solvent in the presence of a first aqueous salting agent solution to produce an organic extract containing substantially all of the uranium and plutonium and at least part of at least one selected fission product selected from the class consisting of ruthenium, zirconium, and niobium, and to produce an aqueous raffinate containing the fission products including the balance of said selected fission products, (B) countercurrently contacting said organic extract with a second aqueous salting agent solution to produce a first aqueous extract containing substantially all of the plutonium, and to produce a substantially plutonium-free organic raffinate containing substantially all of the uranium and said part of said selected fission products, (C) countercurrently contacting said organic raffinate with a third aqueous salting agent solution to produce a lean organic solvent as raffinate and to produce a second aqueous extract containing said uranium and said part of selected fission products; purifying said lean organic solvent prior to recirculation in the process; dehydrating said aqueous raffinate by evaporation and calcination to produce substantially anhydrous mixed oxides of said fission products and selected fission products; treating said first aqueous extract to recover plutonium values therefrom; dehydrating said second aqueous extract stream by evaporation and calcining it to produce a mixture of anhydrous uranium trioxide ($UO_3$) and fission product oxides; directly and without intervening chemical treatment fluorinating the anhydrous mixture of oxides with elemental fluorine to produce a mixture of uranium hexafluoride and the corresponding fission product fluorides; and fractionating the fluoride mixture to separate the relatively high boiling selected fission product fluoride substantially completely from the relatively low boiling uranium hexafluoride to produce an acceptably decontaminated uranium hexafluoride product.

10. A method for separating fission products from the thorium and uranium in an aqueous solution of irradiated nuclear reactor fuel which comprises subjecting said solution to a single-cycle three-stage solvent extraction with an organic solvent in the presence of an aqueous salting agent; said three-stage solvent extraction comprising (A) countercurrently contacting said solution with an organic solvent in the presence of a first aqueous salting agent solution to produce an organic extract containing substantially all of the thorium and uranium and at least part of at least one selected fission product selected from the class consisting of ruthenium, zirconium, and niobium, and to produce an aqueous raffinate containing the fission products including the balance of said selected fission products, (B) countercurrently contacting said organic extract with a second aqueous salting agent solution to produce a first aqueous extract containing substantially all of the thorium, and to produce a substantially thorium-free organic raffinate containing substantially all of the uranium and said selected fission products, (C) countercurrently contacting said organic raffinate with a third aqueous salting agent solution to produce a lean organic solvent as raffinate and to produce a second aqueous extract containing said uranium and said part of said selected fission products; purifying said lean organic solvent prior to recirculation in the process; dehydrating said aqueous raffinate by evaporation and calcination to produce substantially anhydrous mixed oxides of said fission products and selected fission products; treating said first aqueous extract to recover thorium values therefrom; dehydrating said second aqueous extract stream by evaporation and calcining it to produce an anhydrous mixture of uranium trioxide ($UO_3$) and fission product oxides; directly and without intervening chemical treatment fluorinating said anhydrous mixture of oxides with elemental fluorine to produce a mixture of uranium hexafluoride and the corresponding fission product fluorides; and fractionating the fluoride mixture to separate the relatively high boiling selected fission product fluorides substantially completely from the relatively low boiling uranium hexafluoride to produce an acceptably decontaminated uranium hexafluoride product.

References Cited
UNITED STATES PATENTS 2,833,617   5/1958   Seaborg et al. -------- 176—16

OTHER REFERENCES

Flanary: 1955 Geneva Conference Proceedings, pages 528–531.

Reactor Handbook, 2nd ed., vol. II (1961), pages 131–134, 146–148, 150, 151.

ANL–6117—Argonne National Laboratory Report 6117, August 1960, pages 3–4.

HW–68922—A Uranium Hexafluoride Process at Hanford, C. A. Rohrmann, Mar. 20, 1961.

CARL D. QUARFORTH, *Primary Examiner.*

S. TRAUB, M. J. McGREAL, *Assistant Examiners.*